(12) United States Patent
Morrison et al.

(10) Patent No.: US 7,785,076 B2
(45) Date of Patent: Aug. 31, 2010

(54) REFRACTORY COMPONENT WITH CERAMIC MATRIX COMPOSITE SKELETON

(75) Inventors: Jay Morrison, Oviedo, FL (US); Andrew Szweda, San Diego, CA (US)

(73) Assignee: Siemens Energy, Inc., Orlando, FL (US)

( * ) Notice: Subject to any disclaimer, the term of this patent is extended or adjusted under 35 U.S.C. 154(b) by 725 days.

(21) Appl. No.: 11/215,582

(22) Filed: Aug. 30, 2005

(65) Prior Publication Data

US 2007/0048144 A1    Mar. 1, 2007

(51) Int. Cl.
   *F01D 5/18*    (2006.01)
(52) U.S. Cl. ................................... 416/233
(58) Field of Classification Search ............. 416/229 R, 416/233, 241 B
   See application file for complete search history.

(56) References Cited

U.S. PATENT DOCUMENTS

| | | | |
|---|---|---|---|
| 665,600 A * | 1/1901 | Geisenhoner | 416/233 |
| 2,807,437 A * | 9/1957 | Roush | 416/233 |
| 3,055,437 A * | 9/1962 | Stack | 416/226 |
| 3,137,602 A | 6/1964 | Lincoln | |
| 3,161,238 A * | 12/1964 | Key | 416/226 |
| 3,323,597 A * | 6/1967 | Lougobardi et al. | 416/144 |
| 3,519,228 A * | 7/1970 | Windecker | 244/123.5 |
| 3,937,425 A * | 2/1976 | Harvey | 244/123.5 |
| 3,957,104 A * | 5/1976 | Terpay | 164/132 |
| 4,017,347 A | 4/1977 | Cleveland | |
| 4,203,706 A * | 5/1980 | Hess | 416/97 A |
| 4,269,576 A | 5/1981 | Shibuya | |
| 4,617,072 A | 10/1986 | Merz | |
| 5,306,554 A | 4/1994 | Harrison et al. | |
| 5,469,686 A | 11/1995 | Pykiet | |
| 5,803,402 A * | 9/1998 | Krumweide et al. | 244/117 R |
| 6,013,592 A | 1/2000 | Merrill et al. | |
| 6,197,424 B1 | 3/2001 | Morrison et al. | |
| 6,235,370 B1 | 5/2001 | Merrill et al. | |
| 6,251,526 B1 | 6/2001 | Staub | |
| 6,287,511 B1 | 9/2001 | Merrill et al. | |
| 6,299,953 B1 | 10/2001 | Meier et al. | |
| 6,398,501 B1 | 6/2002 | Darkins, Jr. et al. | |
| 6,451,416 B1 | 9/2002 | Holowczak et al. | |
| 6,481,960 B2 | 11/2002 | Bowen | |
| 6,514,046 B1 * | 2/2003 | Morrison et al. | 416/229 A |
| 6,641,907 B1 | 11/2003 | Merrill et al. | |
| 6,670,046 B1 | 12/2003 | Xia | |
| 6,676,783 B1 | 1/2004 | Merrill et al. | |
| 6,709,230 B2 * | 3/2004 | Morrison et al. | 415/115 |
| 6,746,755 B2 | 6/2004 | Morrison et al. | |
| 6,755,619 B1 | 6/2004 | Grylls et al. | |

(Continued)

*Primary Examiner*—Edward Look
*Assistant Examiner*—Aaron R Eastman

(57) ABSTRACT

Aspects of the invention relate to a construction system and method for components in high temperature environments, such as the hot gas path components of a turbine engine. Such a component can include a skeleton and a coating. The skeleton can be formed by a plurality of interconnected frame members, which can give the component its general shape. The frame members can be made of ceramic matrix composite. A coating can be provided around at least a portion of the skeleton. Preferably, the coating is a refractory material, such as refractory ceramic. Examples of turbine engine components that can be constructed according to aspects of the invention are airfoils with or without platforms, blade rings, combustor tiles and heat shields. A component according to aspects of the invention can be made using low cost fabrication and construction methods.

18 Claims, 13 Drawing Sheets

U.S. PATENT DOCUMENTS

| | | |
|---|---|---|
| 7,093,359 B2 * | 8/2006 | Morrison et al. ......... 29/889.71 |
| 7,258,530 B2 * | 8/2007 | Morrison et al. ............ 416/232 |
| 2004/0146736 A1 | 7/2004 | Ivanov et al. |
| 2007/0028592 A1 * | 2/2007 | Grote et al. ................ 60/39.37 |
| 2007/0128043 A1 * | 6/2007 | Morrison et al. ........ 416/241 B |
| 2008/0025846 A1 * | 1/2008 | Vance et al. ................ 416/233 |

* cited by examiner

REFRACTORY COMPONENT WITH CERAMIC MATRIX COMPOSITE SKELETON

FIELD OF THE INVENTION

The invention relates in general to components in high temperature environments and, more particularly, to components in the hot gas path of a turbine engine.

BACKGROUND OF THE INVENTION

There are a variety of applications in which a component operates in a high temperature environment. For example, during the operation of a turbine engine, many components are exposed to high temperature gases. These hot gas path components must be able to withstand such high temperatures. To that end, the components can be made of materials that are well suited for high temperature applications. One suitable class of materials is refractory ceramics. Various turbine components, such as heat shields, have been made of refractory ceramics. While they have proved to be durable in a gas turbine environment, refractory ceramics have limited strength and strain tolerance, which are barriers to their application to more structural components like turbine vanes.

Another suitable group of materials is ceramic matrix composites (CMC). CMCs offer higher strengths, but they are expensive and are difficult to fabricate into complex shapes. One CMC fabrication method involves laminating fabrics with the fibers oriented essentially parallel to the major surface planes of the component, essentially forming a skin structure. Another CMC fabrication method involves stacking a plurality of CMC laminates to form the desired shape (i.e., with the CMC defining the entire surface, but with fibers oriented in planes normal to the component surface). There are several constraints and drawbacks associated with these constructions. Without internal cooling, many CMC components cannot endure the extreme operational temperatures. When internal cooling is provided, the components cannot endure the thermal gradients that can develop across the components during engine operation. As a result, the CMC components require an insulating coating to reduce these thermal gradients. For example, turbine airfoils made of oxide CMCs are usually protected by a thick thermal barrier coating.

As will be appreciated, both refractory ceramics and CMCs can provide significant benefits in the context of turbine engines or in other high temperature applications. However, neither material system by itself is ideal. Thus, there is a need for a construction system and method that can incorporate both refractory ceramics and CMCs so that the advantages of both material systems can be realized while the limitations of each system are minimized.

SUMMARY OF THE INVENTION

In one respect, aspects of the invention are directed to a component that includes a skeleton and a refractory coating. The skeleton defines the general shape of the component and provides structural support. The skeleton is formed by a plurality of interconnected frame members. The frame members are made of ceramic matrix composite, which can be an oxide-based ceramic matrix composite. In one embodiment, the plurality of frame members can include a first group of frame members extending substantially in a first direction and a second group of frame members extending substantially one or more transverse directions to the first group of frame members.

The frame members can be interconnected in various ways. For instance, one or more frame members can be interconnected to at least one other frame member by a connector. Alternatively, one or more of the frame members can include a cutout for receiving a portion of another frame member.

The refractory coating, which can be ceramic, is provided around at least a portion of the skeleton. A portion of the coating engages at least a portion of the skeleton. Thus, the refractory ceramic coating can define at least a part of an outer surface of the component.

The component can be, for example, a combustor tile or a heat shield. In one embodiment, the component can include an outer peripheral surface that defines a component volume; the skeleton can make up less than about 50 percent of the component volume.

In another respect, aspects of the invention are directed to an airfoil. The airfoil is made of an airfoil-shaped skeleton and a refractory ceramic coating. The airfoil can include an outer peripheral surface defining a component volume. In one embodiment, the skeleton can make up less than about 50 percent of the component volume.

The skeleton is formed by a plurality of interconnected frame members. The frame members are made of ceramic matrix composite, such as an oxide-based ceramic matrix composite. The skeleton includes a plurality of radial frame members interconnected with a plurality of transverse frame members. There are various manners in which the frame members can be interconnected. For example, one or more frame members can include a cutout for receiving a portion another frame member. Alternatively, a connector can be used to interconnect one or more frame members with at least one other frame member.

The refractory ceramic coating is provided around at least a portion of the skeleton. A portion of the coating engages at least a portion of the skeleton. The skeleton provides structural support to the airfoil; the refractory coating provides at least thermal protection.

Such an airfoil construction can include various additional features. For example, in one embodiment, a platform can be formed with the airfoil. To that end, the radial frame members can include an outwardly extending portion. The refractory coating can be provided about and can engage the extending portions to form a platform.

In another embodiment, a rib can extend between a pressure side and a suction side of the airfoil. The rib can be formed by a rib skeleton made of a plurality of interconnected ceramic matrix composite frame members. The refractory coating can be provided around and can engage the rib skeleton.

The airfoil can include one or more cooling passages within at least a portion of the airfoil. The cooling passage can be formed in part by at least one of the frame members.

In yet another respect, aspects of the invention are directed to a ring segment. The ring segment includes a skeleton, which defines the general shape of the ring segment, and a refractory ceramic coating. In one embodiment, the ring segment can have an associated volume, and the skeleton can be less than about 50 percent of the ring segment volume.

The skeleton is formed by a plurality of interconnected ceramic matrix composite frame members. In one embodiment, the ceramic matrix composite can be an oxide-based ceramic matrix composite. The skeleton includes a plurality of radial frame members interconnected with a plurality of transverse frame members. In one embodiment, one or more radial frame members can include a cutout for receiving a portion of a transverse frame member, so that the frame members are interconnected.

The refractory ceramic coating is provided around at least a portion of the skeleton. A portion of the coating engages at least a portion of the skeleton. Thus, the skeleton provides structural support to the airfoil, and the refractory coating provides at least thermal protection.

DETAILED DESCRIPTION OF EMBODIMENTS OF THE INVENTION

Embodiments of the present invention relate to refractory components with a ceramic matrix composite skeleton. Embodiments of the invention will be explained in the context of turbine engine components, but the detailed description is intended only as exemplary. Embodiments of the invention are shown in FIGS. 1-9, but aspects of the invention are not limited to the illustrated structure or application.

Figure 1:
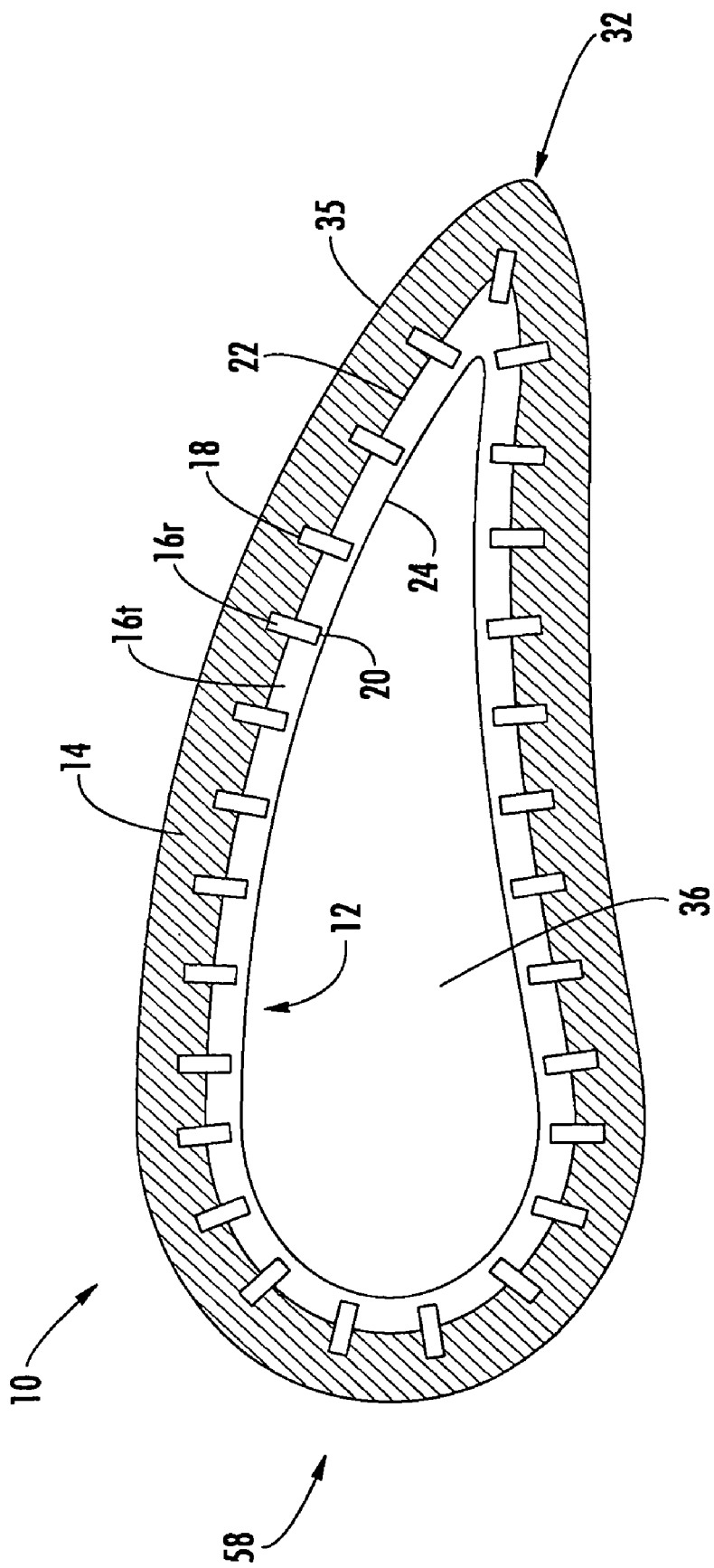
FIG. 1 is a cross-sectional view of an airfoil construction according to aspects of the invention.

Aspects of the invention can be applied to a wide variety of components in the combustor or turbine section of a turbine engine. For example, aspects of the invention can be used to construct an airfoil. Airfoil constructions according to aspects of the invention are shown in FIGS. 1-8. Referring to FIG. 1, an airfoil 10 according to aspects of the invention can include a skeleton 12 and a coating 14, each of which will be discussed in turn below.

The skeleton 12 can be formed by a plurality of interconnected frame members 16. The term "frame" is intended to mean that the members are a supporting structure that gives the component its shape. The frame members 16 can be completely enclosed within the coating 14, or there may be some instances where one or more of the frame members 16 form an outer surface of the component.

There can be various groups of frame members 16 in which the groups are defined by the general direction in which the frame members 16 extend. For example, there can be a first group of frame members extending in substantially the same direction and a second group of frame members extending in one or more directions transverse to the first direction. In the context of the airfoil 10, there can be a plurality of radial frame members 16r and a plurality of transverse frame members 16t. The radial frame members 16r refers to a group of frame members that extend substantially radial to the turbine when the airfoil 10 is installed in its operational position. The transverse frame members 16t refers to a group of frame members that extend in one or more cross-wise directions relative to the radial frame members. In one embodiment, the transverse frame members 16t can be substantially perpendicular to the radial frame members 16r, but other orientations are possible. The term "transverse" can include the axial and circumferential directions relative to the turbine. Again, the terms "radial" and "transverse" are used to facilitate discussion and are not intended to limit the scope of the invention as the frame members 16 can extend in all directions and orientations needed for load carrying capability, among other things. Collectively, the radial and transverse frame members 16r, 16t will be referred to as the frame members 16, unless otherwise noted.

The radial frame members 16r can have an outer surface 18 and an inner surface 20. Likewise, the transverse frame members 16t can have an outer surface 22 and an inner surface 24. The terms "inner" and "outer" are used to generally indicate the relative positions of these surfaces to the central axis (not shown) of the airfoil 10.

The frame members 16 can be made of various materials. For example, the frame members 16 can be made of a ceramic matrix composite material (CMC). In one embodiment, the CMC can be an oxide-oxide CMC; that is oxide fibers in an oxide matrix. However, the frame members 16 can be made of non-oxide CMCs as well. Ideally, the material of the frame members 16 is selected to be compatible with the material used for the coating 14, at least from a thermal expansion and/or a chemical bonding standpoint.

The frame members 16 can have almost any size, shape or features. In one embodiment, the radial frame members 16r can be elongated rectangular in shape, and the transverse frame members 16t can be generally airfoil-shaped or partly airfoil-shaped. Other shapes for the radial and transverse frame members 16r, 16t are possible. The cross-sectional area of the frame members 16 can be substantially constant or it can vary along the length of the frame member 16. Further, radial frame members 16r can be substantially identical in length, width and thickness, but one or more of the radial frame members 16r can be different in at least one of these respects. Similarly, transverse frame members 16t can be substantially identical in length, width and thickness, but one or more of the transverse frame members 16t can be different in at least one of these respects.

The frame members 16 can be positioned and spaced in various ways. The transverse frame members 16t can be substantially parallel to each other; however, one or more transverse frame members 16t can be non-parallel to the other transverse frame members 16t. The transverse frame members 16t can be provided at regular or irregular intervals. In one embodiment, the transverse frame members 16t can be spaced substantially equally apart, or the spacing between one or more pairs of neighboring transverse frame members 16t can be different from the spacing between the other pairs of neighboring transverse frame members 16t. The above descriptions of the spacing of the transverse frame members 16t apply equally to the spacing of the radial frame members 16r.

The frame members 16 can be formed in various ways. Preferably, the CMC material is initially provided in the form of a substantially flat plate. From the flat plate, the frame members 16 can be cut out, such as by computer controlled water jet or laser cutting. If necessary, detailed features are readily incorporated by these methods.

Flat plate CMC can provide numerous advantages. Flat plate CMC provides one of the strongest, most reliable and statistically consistent forms of the material. As a result, manufacturing difficulties that have arisen in the past can be avoided. Flat plates are unconstrained during curing and thus do not suffer from anisotropic shrinkage strains. Ideally, the assembly of the frame members 16 to form the skeleton 12 can occur after each frame member 16 is fully cured so as to avoid shrinkage issues. There is also great flexibility in the manufacture of the flat plate. For example, the fibers can be selectively-oriented to give the frame members the desired properties. In one embodiment, the fibers can reinforce the frame members 16 in two directions. In another embodiment, the fibers can reinforce the frame members 16 in three directions. The combination of fiber orientation within the CMC members 16 and the positioning of the frame members 16 within the skeleton structure 12 can be optimized so as to minimize interlaminar tension during engine operation.

Flat, thin CMC plates also facilitate conventional non-destructive inspection. Moreover, the method of construction reduces the criticality of delamination-type flaws, which are difficult to find. Additionally dimensional control is more easily achieved as flat plates can be accurately formed and machined to shape using cost-effective cutting methods. A flat plate construction also enables scaleable and automatable manufacture.

In forming the skeleton 12 according to aspects of the invention, the radial and transverse frame members 16r, 16t can be interconnected, directly or indirectly. Each radial frame member 16r can be interconnected with at least one transverse frame member 16t. There are various ways of interconnecting the frame members 16; a few examples are shown in FIGS. 2A-2C.

Figure 2A:
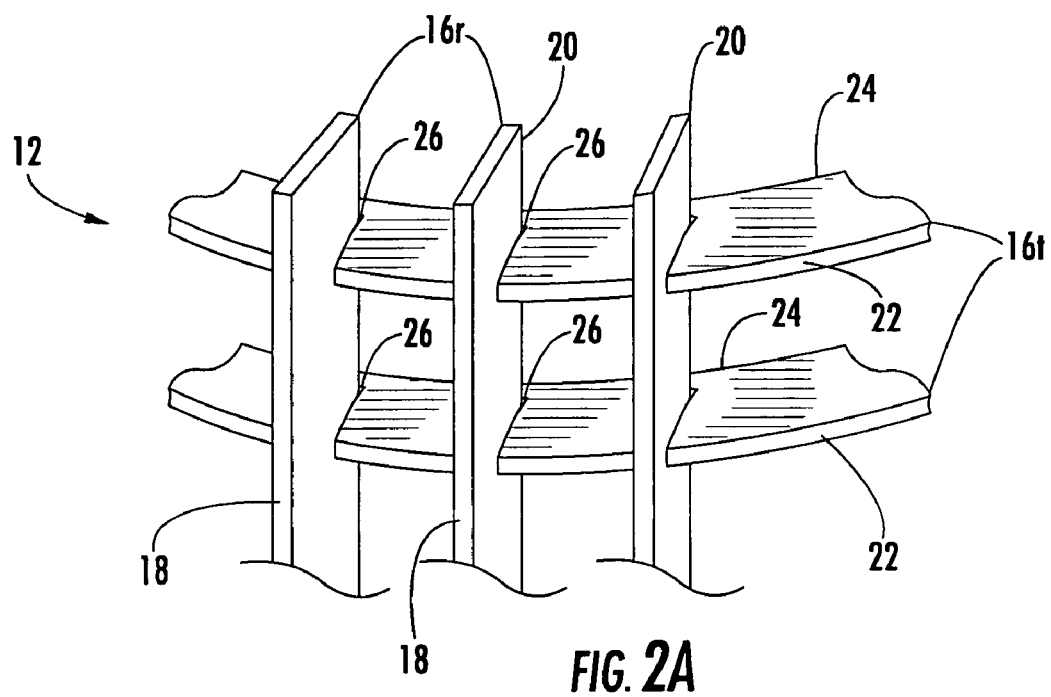
FIG. 2A is a view of a portion of a skeleton according to aspects of the invention, showing radial frame members being received within cutouts in the transverse frame members.

In one embodiment, shown in FIG. 2A, the transverse frame members 16t can include slot-like cutouts 26. While all the cutouts are shown as being provided in the outer surface 22 of the transverse frame members 16t, it will be appreciated that the cutouts 26 can also be provided solely in the inner surface 24 or in both the inner and outer surfaces 22, 24. In any event, the cutouts 26 in the plurality of transverse frame members 16t can be substantially radially aligned. Thus, the cutouts 26 can receive a portion of the radial frame members 16r.

Figure 2B:
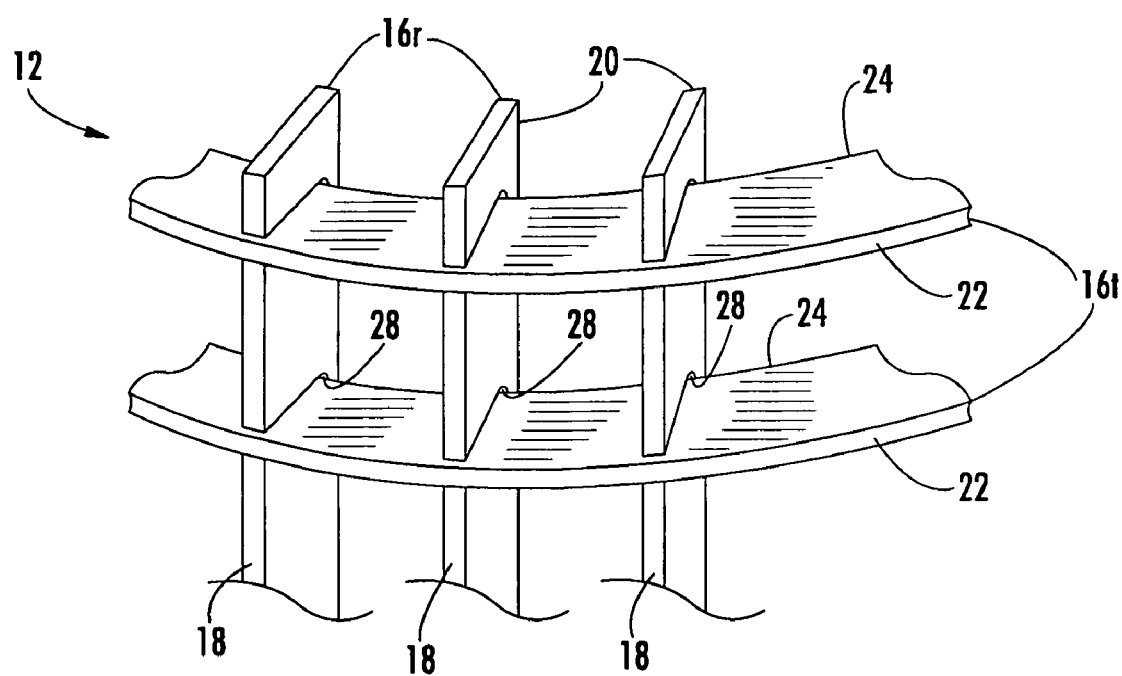
FIG. 2B is a view of a portion of the skeleton according to aspects of the invention, showing an alternative construction in which the transverse frame members are received within cutouts in the radial frame members.
Figure 2C:
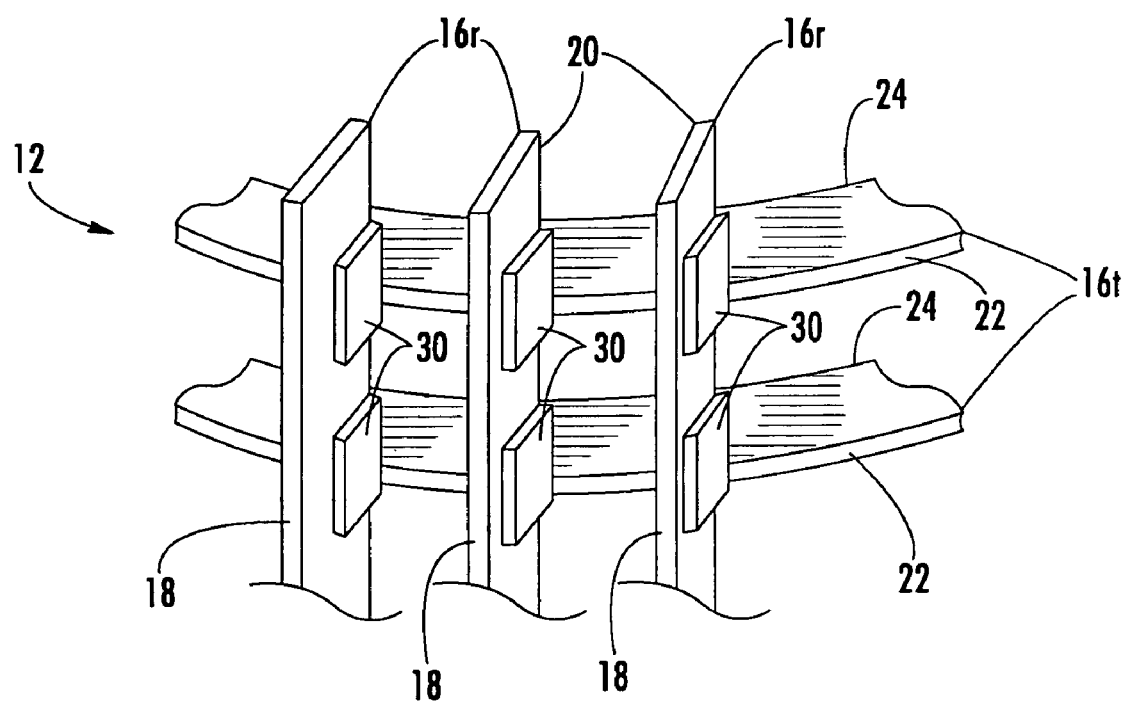
FIG. 2C is a view of a portion of the skeleton according to aspects of the invention, showing another alternative construction in which the radial and transverse frame members are joined by connectors.

FIG. 2B shows an alternative manner of interconnecting the frame members 16. As shown, the radial frame members 16r include slot-like cutouts 28. The cutouts 28 can be provided solely in the outer surface 18 of the radial frame members 16r. Alternatively, the cutouts 28 can also be provided solely in the inner surface 20 or in both the outer and inner surfaces 18, 20. The cutouts 28 in the radial frame members 16r can be substantially aligned so that they can receive a portion of the transverse frame member 16t.

In either of the above-described manners of interconnecting the frame members 16, the tolerance of the cutouts 26 or 28 can be tightly controlled for a tight fit with the received frame member 16. The depth of the cutouts 26 or 28 can be varied, as needed, to achieve the desired engagement with the received frame member 16.

Separately or in combination with the above-described cutouts 26 or 28, the frame members 16 can be interconnected by one or more connectors 30, as shown in FIG. 2C. In one embodiment, the connectors 30 can be pins or other fasteners. The connectors 30 can be used to directly or indirectly interconnect the frame members 16. Still other forms of interconnection are included within aspects of the invention. For instance, the frame members 16 can be interconnected using SnapSat™ construction, an example of which is disclosed in U.S. Pat. No. 5,803,402, which is incorporated herein by reference. While SnapSat™ is directed to the production of spacecraft structures, it will readily be appreciated how it can be applied to the frame members 16 according to aspects of the invention.

Again, the foregoing are merely examples of the numerous ways in which the frame members 16 can be interconnected. Aspects of the invention are not limited to any specific manner of interconnection. Indeed, any form of interconnection can be used so long as the frame members 16 are sufficiently connected to form the skeleton 12.

Figure 3:
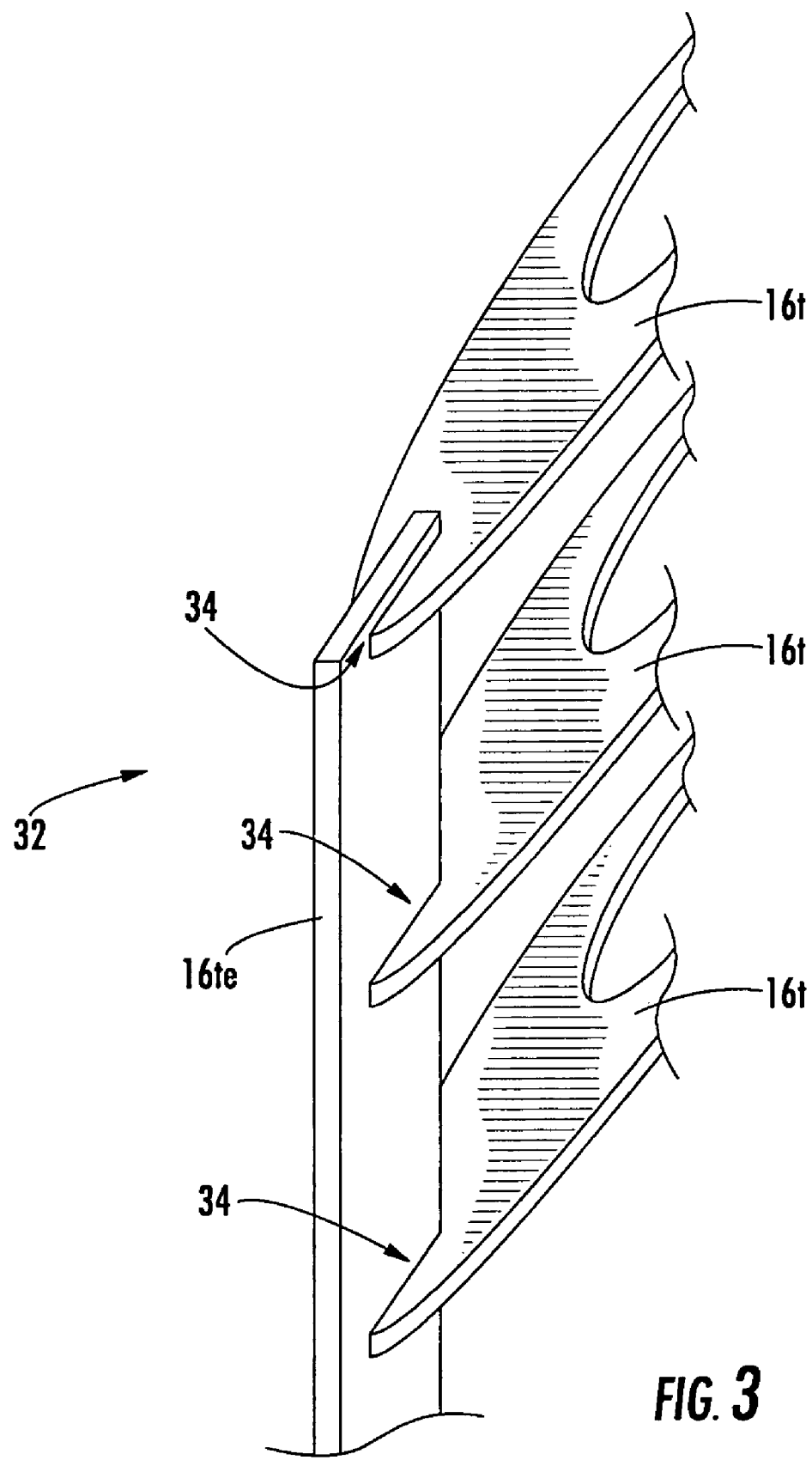
FIG. 3 is a view of a portion of the skeleton according to aspects of the invention, showing one possible construction of the trailing edge.

The airfoil 10 includes a trailing edge 32. One manner of a forming the trailing edge portion of the skeleton 12 is shown in FIG. 3. As shown, each of the transverse frame members 16t can be include a cutout 34 at or near the trailing edge 32. The cutouts 34 can be substantially aligned in the radial direction. Thus, a trailing edge radial frame member 16te can be received within the cutouts 34. The foregoing description of such features applies equally to the trailing edge 32. Preferably, there is a close fit between the radial frame member 16te and the cutouts 34. Though not shown, aspects of the invention can include a trailing edge construction where cutouts are provided on the trailing edge radial frame member 16te for receiving the transverse frame members 16t. Again, additional connectors 30 including any of those discussed above can be used to interconnect the frame members 16t, 16te.

Aside from the skeleton 12, an airfoil 10 according to aspects of the invention further includes a coating 14. The coating 14 can define at least a part of the outer peripheral surface 35 of the airfoil 10. The coating 14 can be a refractory material, which is intended to mean any heat-resistant material having a high melting point. Preferably, the coating 14 can provide protection from abrasion, heat and oxidation. The coating 14 can be non-metallic. Preferably, the coating 14 is ceramic. One example of a refractory ceramic coating is friable graded insulation (FGI). Various examples of FGI are disclosed in U.S. Pat. Nos. 6,676,783; 6,670,046; 6,641,907; 6,287,511; 6,235,370; and 6,013,592, which are incorporated herein by reference. Another refractory ceramic is AN-191, which is available from Saint-Gobain, Worcester, Mass. These and other refractory materials can include reinforcements, such as ceramic fibers or whiskers. Ideally, the coating 14 is selected so as to be compatible with the material of the frame members 16 of the skeleton 12, at least from a chemical bonding and/or thermal expansion standpoint.

Preferably, the refractory material is castable so that, once the skeleton 14 is formed, the refractory material can be cast around the skeleton 12 to shape. The castable refractory can facilitate net shape fabrication; that is, the casting process can yield a substantially finished part such that minimal, if any, subsequent processes are needed. Thus, the ultimate shape of the airfoil 10 can be cast and defined in a single step as opposed to needing substantial post-casting processes to shape the airfoil 10.

However, aspects of the invention are not limited to refractory materials that are castable nor to forming the coating 14 by conventional wet casting. One alternative is a dry casting process that introduces large, thermally stable particles by packing in a dry state and subsequently introducing a liquid or slurry to bind the particles together. In one embodiment, the airfoil 10 can be formed by injection molding the coating 14 about at least a portion of the skeleton 12. However, the coating 14 is provided about the skeleton 12, and a portion of the coating 14 can engage the skeleton 12. The term "engage" as used herein is intended to mean that the coating 14 can be at least bonded, secured, attached, connected and/or interlocked within, between, on and/or around the skeleton 12.

Because CMC is only used in the skeleton 12, it will be appreciated that less CMC is used than in a conventional CMC airfoil construction or a stacked laminated CMC airfoil construction, thereby providing significant cost savings. In one embodiment, CMC can make up less than about 50 percent of the total volume of a component constructed according to aspects of the invention. In the context of the airfoil 10, volume can be defined as the total volume enclosed within the outer peripheral surface 35 of the airfoil 10 including any hollow areas, such as a central cavity 36.

Further, it should be noted that the skeleton 12 can be arranged so that the reinforcing fibers in the frame members 16 are oriented in a desired way relative to at least a portion of the outer peripheral surface 35 of the airfoil 10, such as that portion of the outer peripheral surface 35 that is substantially proximate a particular frame member 16. In one embodiment, one or more frame members 16 can be positioned so that the fibers of the CMC frame member 16 are oriented substantially normal to a proximate portion of the outer peripheral surface 35.

The frame members 16 can include features to mechanically lock the coating 14 into place, such as irregular surfaces (not shown). The coating 14 can fill in the space between the frame members 16 and can cover at least a portion of the frame members 16. It should be noted that the term "coating" may suggest that the coating 14 completely covers the skeleton 12, but aspects of the invention are not so limited. For example, the coating 14 may not be applied to those surfaces of the frame members 16 that are not in need of protection from the operational environment or that are not exposed to a threatening environment in operation. For example, as shown in FIG. 1, the coating 14 can be applied so that it does not cover the inner surfaces 20, 24 of the frame members 16r, 16t. The airfoil 10 can include a central cavity 36 for cooling or other purposes, but the airfoil 10 may not have any central hollow cavity or hollow portion.

An airfoil 10 formed according to aspects of the invention can be used in a turbine engine as, for example, a stationary airfoil. The various operational loads which act upon the airfoil 10 can be managed by the construction according to aspects of the invention. The main load path is through the CMC frame members 16. Internal pressure loads, which can be caused by interior cooling, can be managed by the transverse frame members 16t while bending loads can be managed by the radial frame members 16r. The coating 14 can provide durability and thermal protection.

Figure 6:
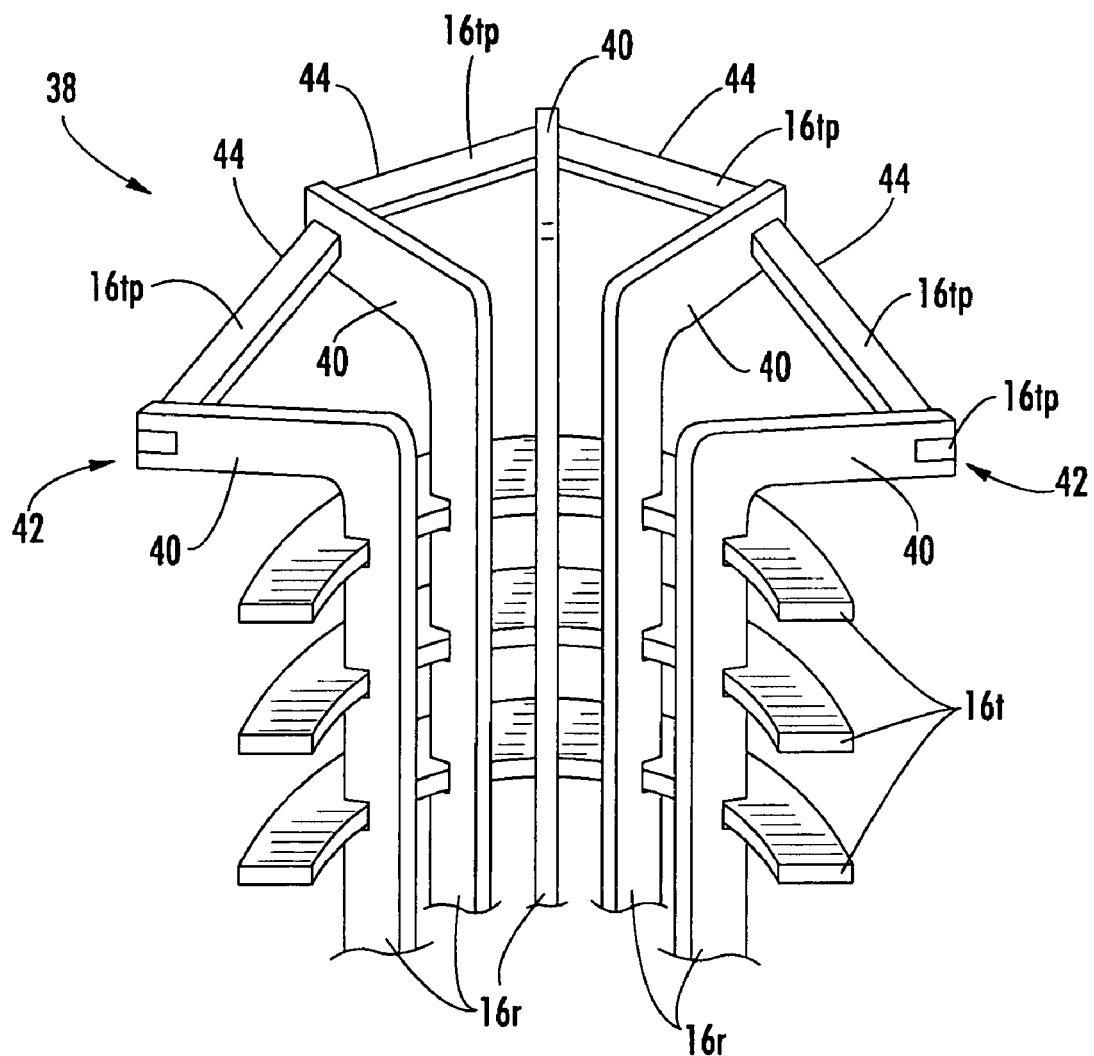
FIG. 6 is a view of a portion of the skeleton according to aspects of the invention, showing one possible construction of a vane platform.

Aspects of the invention can be used to provide other features associated with the airfoil 10. For example, aspects of the invention can be used to form at least one platform 38 with the airfoil 10. One example of such a construction is shown in FIG. 6. As shown, the radial frame members 16r can be used to shape the platform 38. The radial frame members 16r can include portions 40 that extend outward in the axial and circumferential directions relative to the turbine. In one embodiment, the portions 40 can extend substantially perpendicular to the rest of the radial frame member 16r. One or more transverse platform frame members 16tp can be used to interconnect the extending portions 40 of the radial frame members 16r. Cutouts 42 can be provided on the radial frame members 16r to receive the transverse platform frame members 16tp. The transverse platform frame members 16tp can be rigidized rods, CMC or ceramic fiber bundles or braids. The transverse platform frame members 16tp may be too flimsy to cast the coating 14 around, so the outer edges 44 of the transverse platform frame members 16tp can be reinforced with ceramic fiber bundles or braids. In one embodiment, it may be desirable to increase the number of frame members 16 at the fillet regions of the airfoil 10.

Figure 7:
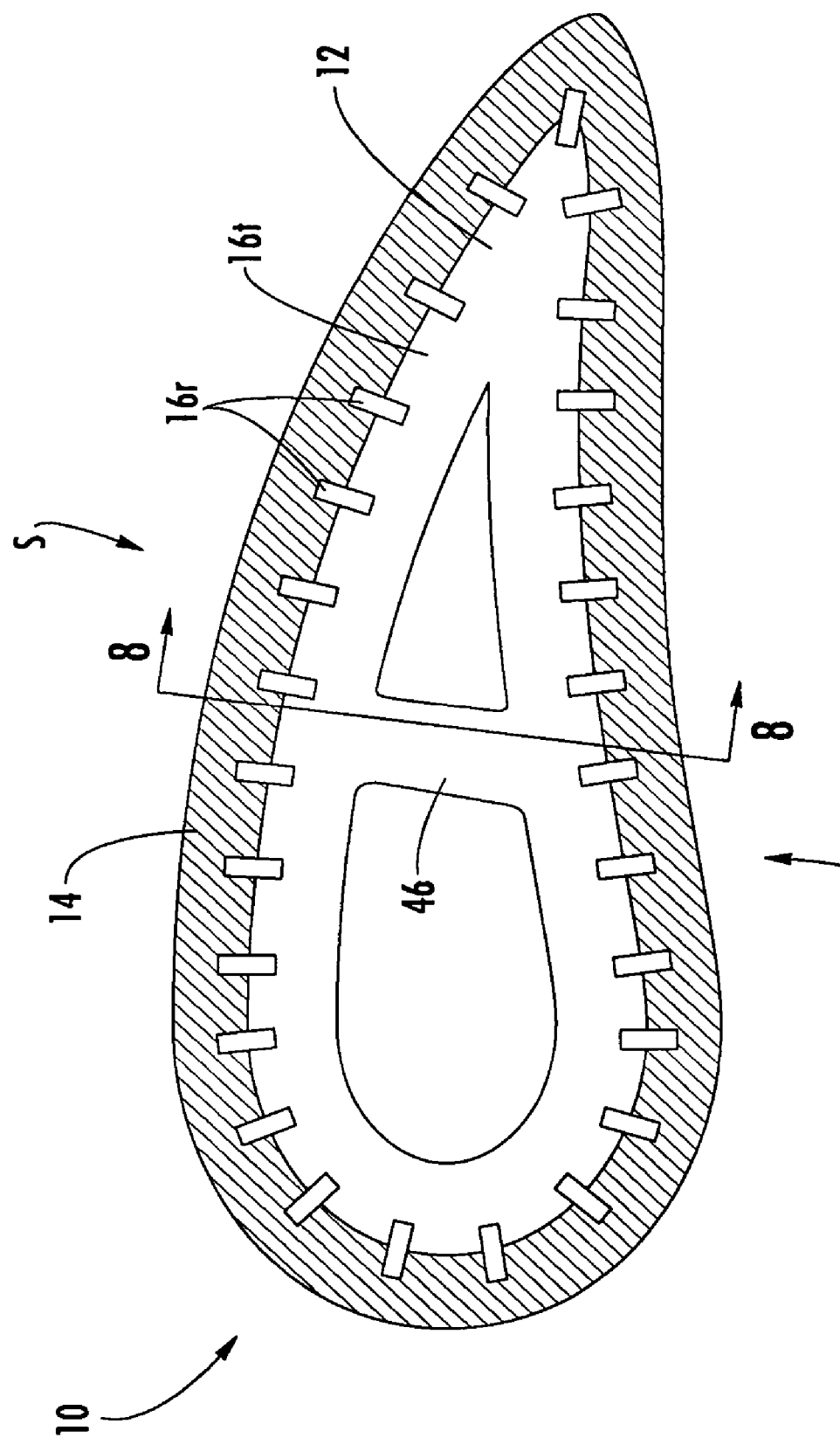
FIG. 7 is a top plan view of an airfoil construction according to aspects of the invention, wherein the airfoil includes a rib.
Figure 8A:
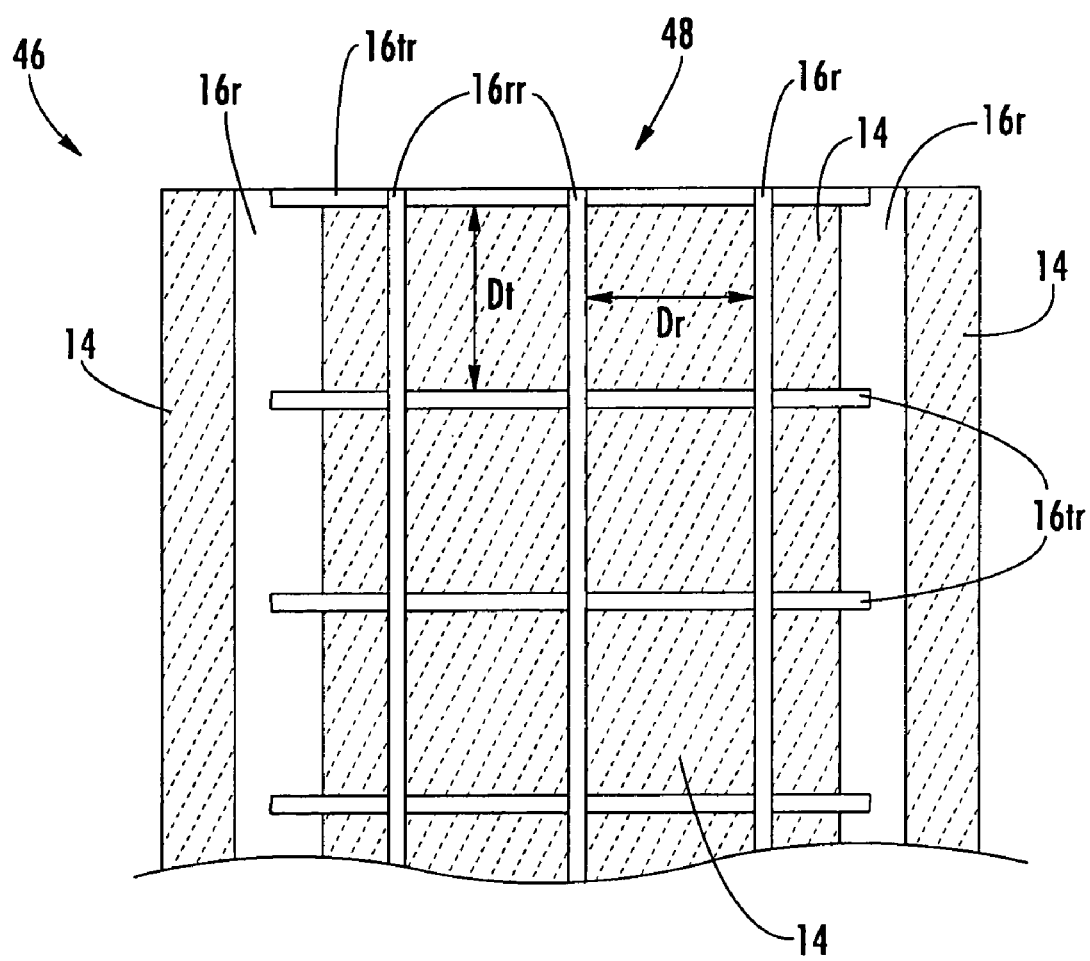
FIG. 8A is a view of one possible rib construction according to aspects of the invention.

Another feature that can be included in an airfoil 10 according to aspects of the invention is one or more ribs 46, as shown in FIG. 7. The rib 46 can extend between the pressure side P and the suction side S of the airfoil 10. The use of a rib 46 in an airfoil 10 and the benefits of such a construction are known and are discussed in, for example, U.S. Pat. Nos. 6,398,501 and 5,306,554, which are incorporated herein by reference. Further, by providing a rib 46, the quantity of transverse frame members 16t can be minimized for pressure containment purposes. A rib 46 can be formed according to aspects of the invention in several ways. For instance, as shown in FIG. 8A, the rib 46 can include a rib skeleton 48 formed by a series of radial rib frame members 16rr and transverse rib frame members 16tr, which can be interconnected in any of the ways discussed above. The radial and transverse rib frame members 16rr, 16tr can also be interconnected with at least some of the frame members 16, such as the radial frame members 16r. In one embodiment, the spacing Dt between the transverse rib frame members 16tr can be greater than the spacing Dr between the radial rib frame members 16rr.

Figure 8B:
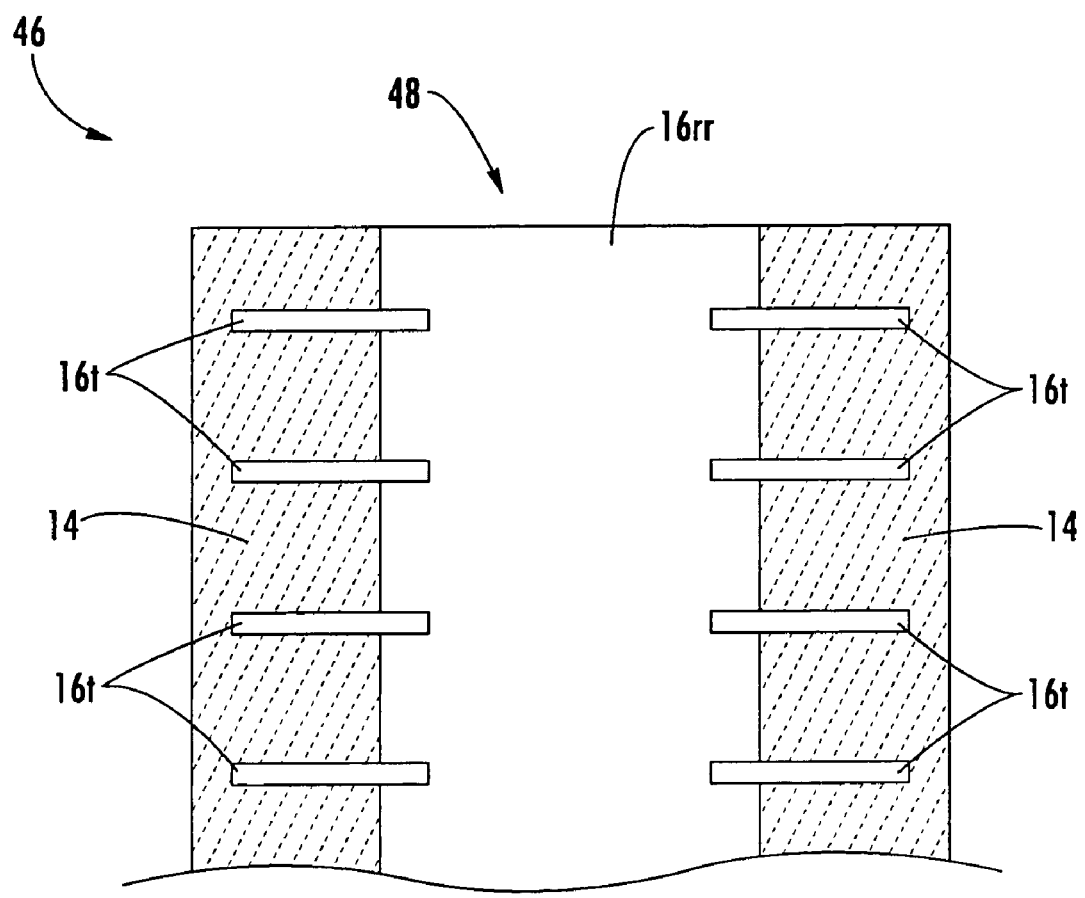
FIG. 8B is a view of an alternative rib construction according to aspects of the invention.

An alternative construction is shown in FIG. 8B. As shown, the rib 46 can be formed by one or more radial rib frame members 16rr. In one embodiment, the radial rib frame member 16rr can be substantially rectangular. The radial rib frame member 16rr can span across the airfoil 10 and interconnect with the transverse frame members 16t to form the rib skeleton 48.

Figure 8C:
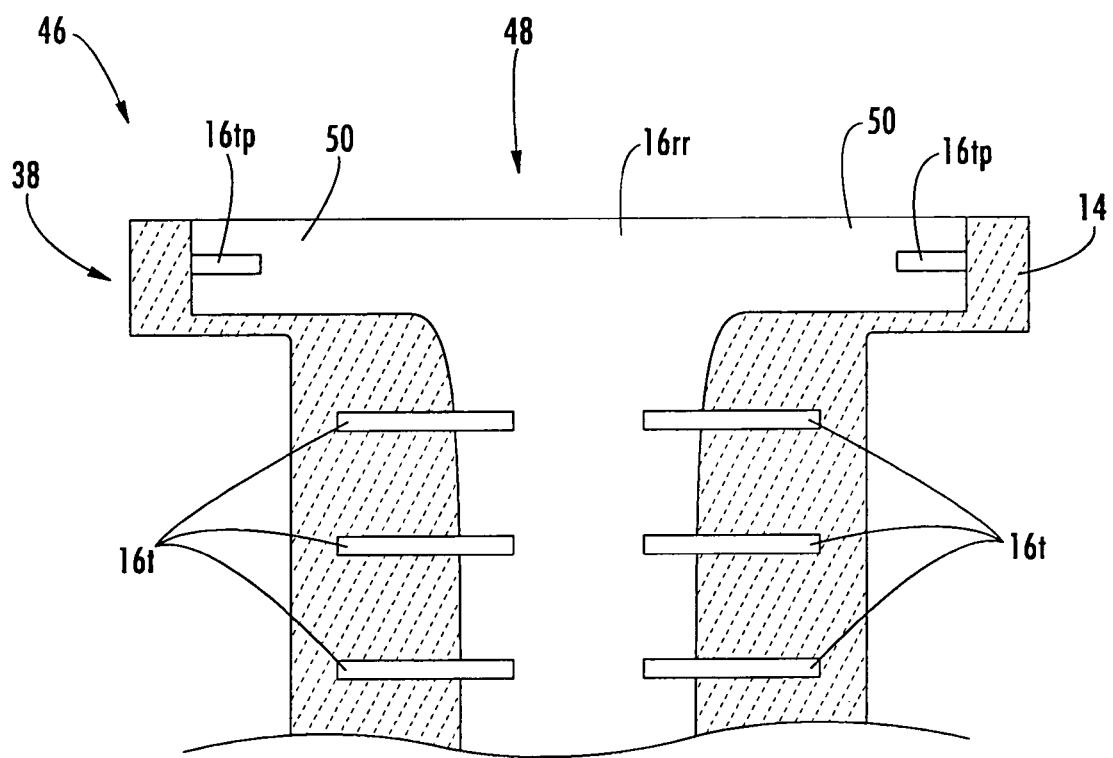
FIG. 8C is a view of yet another alternative rib construction according to aspects of the invention, in which the rib cooperates to form a platform.

It will be appreciated that the radial rib frame member 16rr can also be used to form a part of the platform 38, as shown in FIG. 8C. In such case, the radial rib frame member 16rr can include extending arms 50 so as to be generally T-shaped. The extending arms 50 of the radial rib frame member 16rr can be interconnected with the extending portions 40 of the radial frame members 16r (which cannot be seen in FIG. 8C) by the transverse platform frame members 16tp. Regardless of the specific manner in which the rib skeleton 48 is formed, the coating 14 can be cast or otherwise provided around the skeleton 48 to form the rib 46.

Figure 4A:
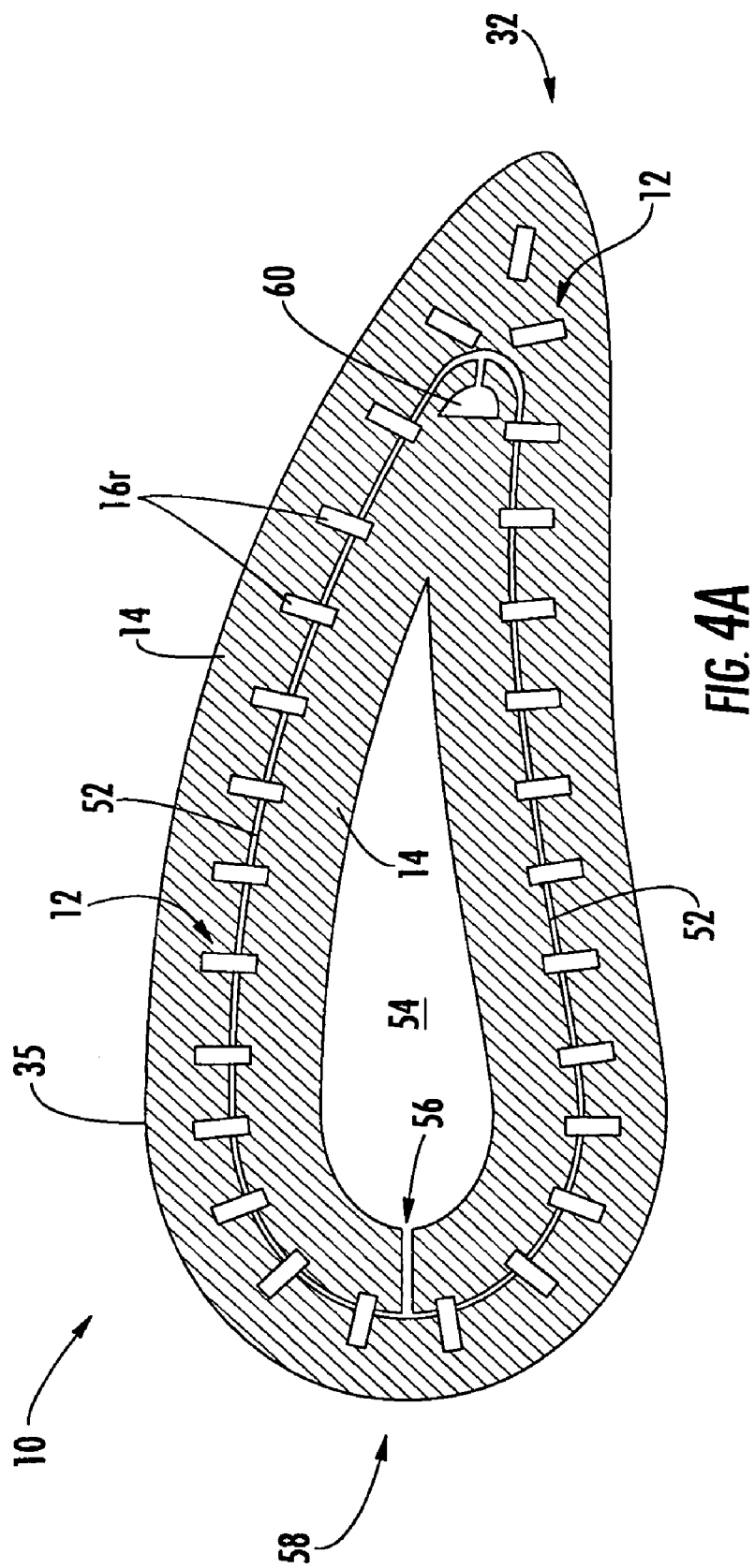
FIG. 4A is a cross-sectional view of an airfoil construction according to aspects of the invention, showing one possible cooling system.
Figure 4B:
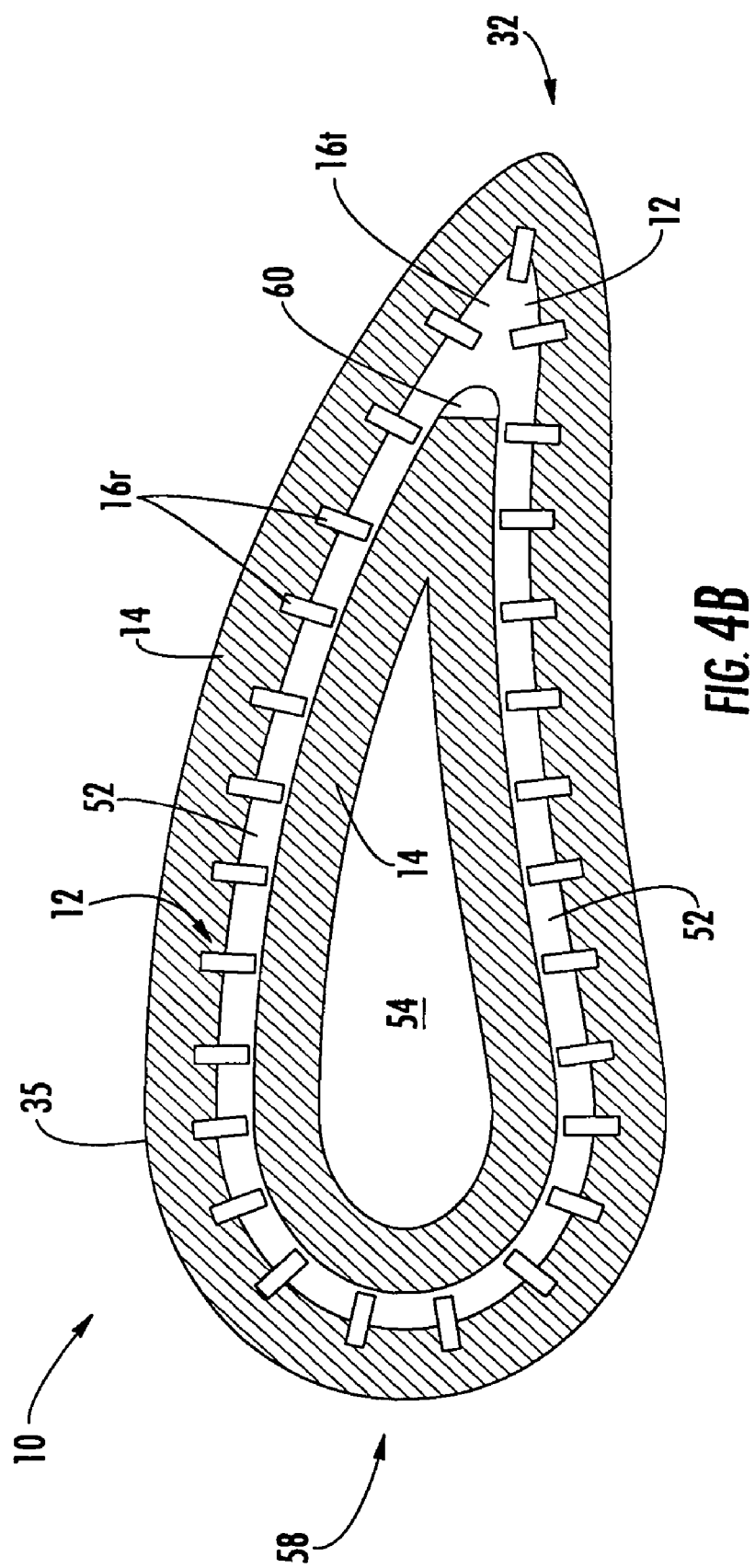
FIG. 4B is a cross-sectional view of the airfoil construction of FIG. 4A taken along a plane substantially parallel to the plane in FIG. 4A but at a different elevation.
Figure 5:
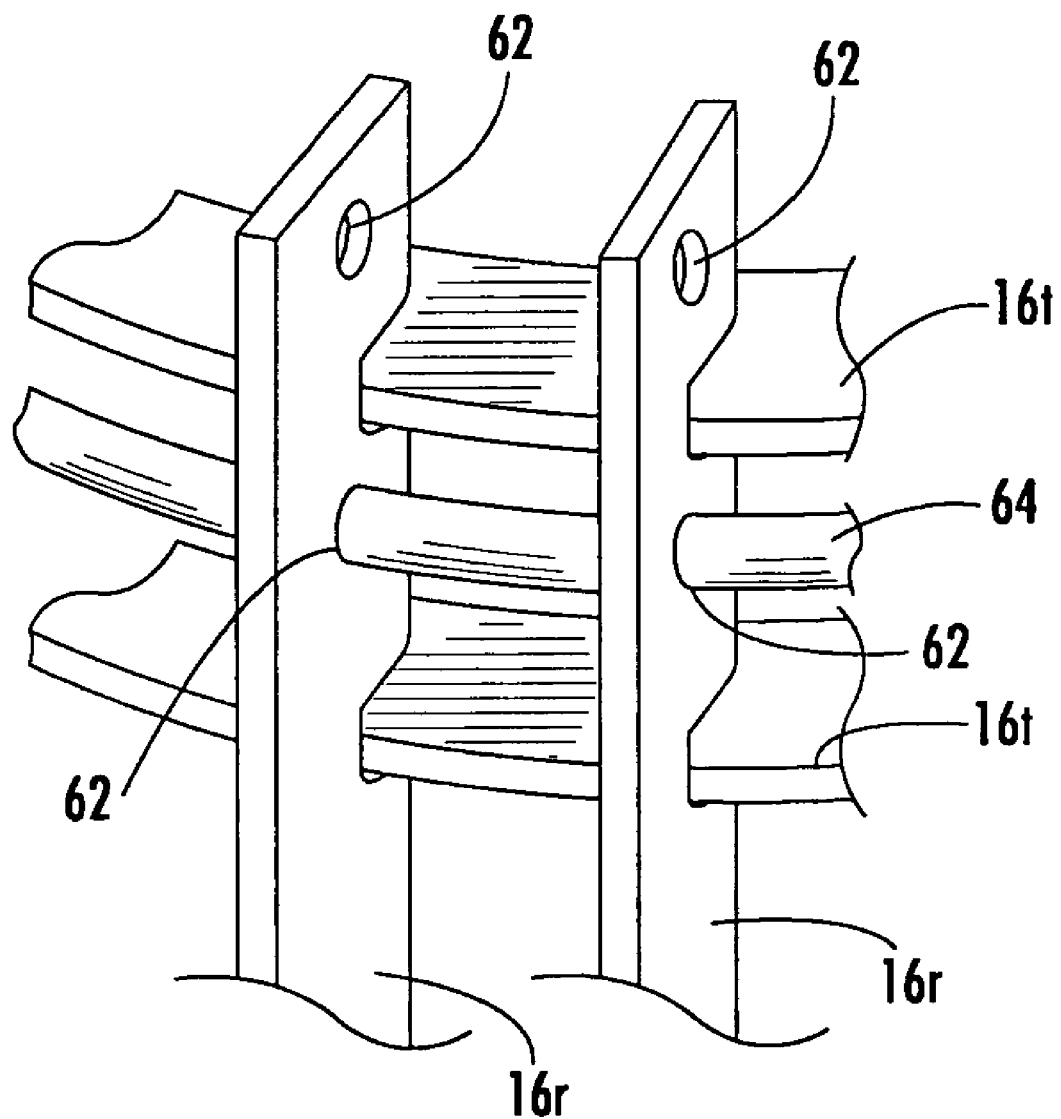
FIG. 5 is a cross-sectional view of an airfoil construction according to aspects of the invention, showing one possible manner in which the cooling system shown in FIG. 4 can be formed.

Aspects of the invention can further be used to include cooling features in the airfoil 10. One example of a cooling system according to aspects of the invention is shown in FIGS. 4A-4B. Referring to FIG. 4A, a cooling passage 52 can extend about the airfoil 10. Multiple cooling passages 52 can be provided. In such case, the cooling passages 52 can be radially spaced. A cooling fluid, such as air, can be introduced to the cooling passages 52 by a supply plenum 54. The supply plenum 54 can be in fluid communication with the cooling passages 52, such as by a conduit 56. The conduit 56 can deliver a cooling fluid to the cooling passages 52 at or near the leading edge 58 of the airfoil 10, but other locations are possible. After entering the cooling passages 52, the cooling fluid can flow through the cooling passages 52 and be routed to a trailing edge plenum 60. The trailing edge plenum 60 can serve to equilibrate cooling fluid pressure from the multiple passages 52 to evenly supply the spent cooling fluid to exit passages (not shown) for discharge, thus providing more uniform cooling flow and temperature profile.

As shown in FIG. 4B, the trailing edge plenum 60 can extend substantially radially through the airfoil 10. The trailing edge plenum 60 can be defined by the coating 14 and/or the skeleton 12 (such as transverse frame member 16*t*).

The cooling passages 52 can be formed in various ways. For instance, openings 62 can be provided in the frame members 16. In one embodiment, shown in FIG. 5, the openings 62 can be provided in the radial frame members 16*r*. In such case, the openings 62 can be substantially aligned in the transverse direction. Once the skeleton 12 is assembled, fugitive rods 64 can be routed through the openings 62. The fugitive rods 64 can be supported by the openings 62 in the radial frame members 16*r*. The fugitive rods 64 can remain in place while the coating 14 is cast or otherwise provided around the skeleton 12. Subsequently, the fugitive rods 64 can be removed, thereby leaving the cooling passages 52 behind. In one embodiment, the fugitive rods 64 can be removed by heating steps introduced after the casting process to burn or melt the fugitive rods 64. Thus, the openings 64 can define a portion of the cooling passages 52. The conduit 56 can be formed in a similar manner. The supply plenum 54 and the trailing edge plenum 60 can be formed by positioning a core in the desired places prior to applying the coating 14.

Figure 9:
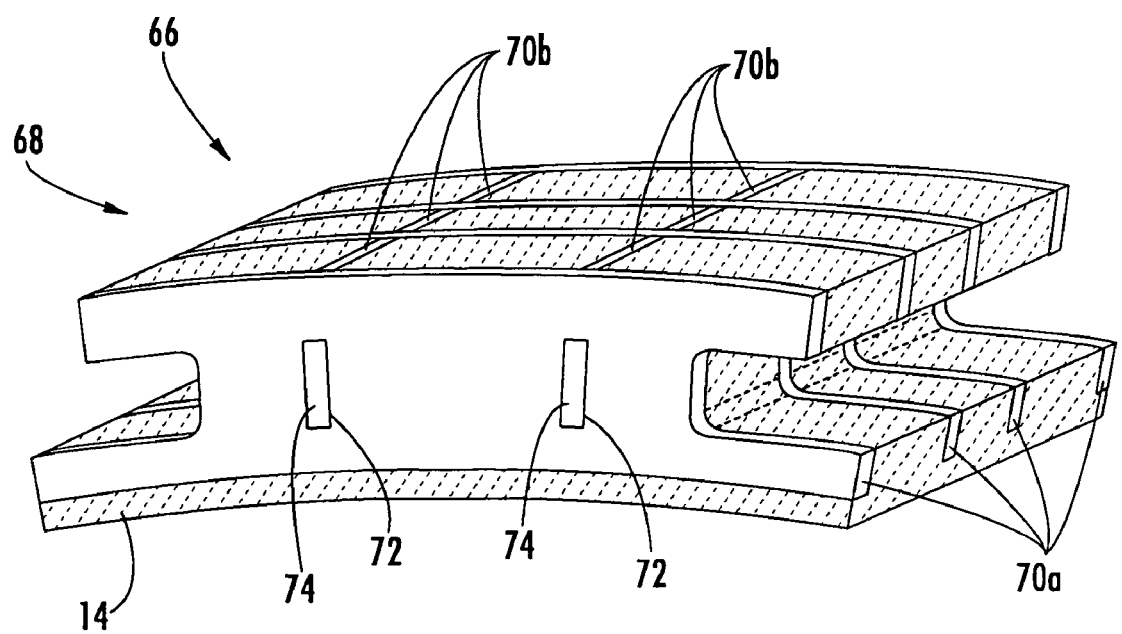
FIG. 9 is an isometric view of a ring segment formed according to aspects of the invention.

While the foregoing discussion has been directed to the construction of an airfoil 10, aspects of the invention can be used to form other hot gas path components in a turbine engine. For example, a ring segment (also known as a blade outer air seal or a shroud) can be formed in accordance with aspects of the invention. As is known, a ring segment is a component that can be attached to the stationary structure in the turbine section of the engine, such as the turbine casing or a blade ring or other vane carrier. The ring segment is in close proximity to the tips of the rotating turbine airfoils. One example of a ring segment 66 formed according to aspects of the invention is shown in FIG. 9.

Like the airfoil 10, the ring segment 66 can have a skeleton 68 that is formed by a plurality of frame members 70. The foregoing description of the frame members 16 and the manner in which they are connected is equally applicable here. It should be noted that the frame members 70 used to form the ring segment 66 can all be substantially radial members, as shown in FIG. 9. A first group of frame members 70*a* can be generally H-shaped, and a second group of frame members 70*b* can be positioned between the individual frame members of the first group 70*a*. The first group of frame members 70*a* can provide cutouts 72 that can receive a tab 74 protruding from each of the second group of frame members 70*b*. Once the skeleton 68 is formed, the coating 14 can be cast or otherwise provided around the skeleton 68 as discussed above.

While especially suited for the construction of airfoils and ring segments, aspects of the invention can be used to construct other turbine engine components including, for example, combustor tiles, heat shields and other components defining the hot gas flow path in a turbine engine. While aspects of the invention are particularly intended for hot gas path components of a turbine engine or components in high temperature application, aspects of the invention are not limited to these fields as there may be other components and other applications in which a construction system according to aspects of the invention may prove desirable. Similarly, aspects of the invention are ideal for use in making structural components, but they can readily be employed to form non-structural components as well.

Numerous benefits can be realized in forming components using a construction system according to aspects of the invention including those discussed herein. Overall, the system can produce components using low cost fabrication and construction methods. Further, aspects of the invention can take advantage of the benefits of various materials while minimizing their drawbacks and limitations.

The foregoing description is provided in the context of various construction systems for turbine airfoils and ring segments. It will be appreciated that aspects of the invention can be used in connection with other components in a turbine engine and with components in fields outside of the context of turbine engines. Thus, it will of course be understood that the invention is not limited to the specific details described herein, which are given by way of example only, and that various modifications and alterations are possible within the scope of the invention as defined in the following claims.

What is claimed is:

1. A component comprising:
    a skeleton formed by a plurality of interconnected ceramic matrix composite frame members, whereby the skeleton defines the general shape of the component and provides structural support; and
    a refractory coating provided around at least a portion of the skeleton, wherein a portion of the coating engages at least a portion of the skeleton, whereby the refractory ceramic coating defines at least a part of an outer surface of the component,
    wherein the component has an associated volume, wherein the skeleton makes up less than about 50 percent of the volume of the component.

2. The component of claim 1 wherein the component is one of a combustor tile and a heat shield.

3. The component of claim 1 wherein the ceramic matrix composite is an oxide-based ceramic matrix composite.

4. The component of claim 1 wherein a plurality of frame members includes a first group of frame members extending substantially in a first direction and a second group of frame members extending substantially in at least one direction transverse to the first group of frame members.

5. The component of claim 1 wherein at least one of the frame members includes a cutout for receiving a portion of another frame member, whereby the frame members are interconnected.

6. The component of claim 1 wherein at least one of the frame members is interconnected to at least one other frame member by a connector.

7. The component of claim 1 wherein the refractory coating is ceramic.

8. An airfoil comprising:
    an airfoil-shaped skeleton formed by a plurality of interconnected ceramic matrix composite frame members including a plurality of radial frame members interconnected with a plurality of transverse frame members; and
    a refractory ceramic coating provided around at least a portion of the skeleton, wherein a portion of the coating engages at least a portion of the skeleton, whereby the skeleton provides structural support to the airfoil and the refractory coating provides at least thermal protection, wherein the airfoil includes an outer peripheral surface defining an airfoil volume, wherein the skeleton makes up less than about 50 percent of the airfoil volume.

9. The airfoil of claim 8 wherein at least one of the frame members includes a cutout for receiving a portion another frame member, whereby the frame members are interconnected.

10. The airfoil of claim 8 wherein at least one of the frame members is interconnected to at least one other frame member by a connector.

11. The airfoil of claim 8 wherein the ceramic matrix composite is an oxide-based ceramic matrix composite.

12. The airfoil of claim 8 wherein the radial frame members include an outwardly extending portion, wherein the refractory coating is provided about and engages the extending portions, whereby a platform is formed with the airfoil.

13. The airfoil of claim 8 wherein the airfoil includes a pressure side and a suction side, and further including a rib extending between the pressure side and the suction side of the airfoil, wherein the rib is formed by a rib skeleton including a plurality of interconnected ceramic matrix composite frame members, and wherein the refractory coating is provided around and engages the rib skeleton.

14. The airfoil of claim 8 further including at least one cooling passage within at least a portion of the airfoil, wherein the cooling passage is formed in part by at least one of the frame members.

15. A ring segment comprising:

a skeleton formed by a plurality of interconnected ceramic matrix composite frame members including a plurality of radial frame members interconnected with a plurality of transverse frame members, wherein the skeleton forms the shape of a ring segment; and a refractory ceramic coating provided around at least a portion of the skeleton, wherein a portion of the coating engages at least a portion of the skeleton, whereby the skeleton provides structural support to the airfoil and the refractory coating provides at least thermal protection.

16. The ring segment of claim 15 wherein at least one of the radial frame members includes a cutout for receiving a portion of a transverse frame member, whereby the frame members are interconnected.

17. The ring segment of claim 15 wherein the ceramic matrix composite is an oxide-based ceramic matrix composite.

18. The ring segment of claim 15 wherein the ring segment has an associated volume, wherein the skeleton is less than about 50 percent of the ring segment volume.

* * * * *